(12) United States Patent
Fox

(10) Patent No.: US 9,233,823 B2
(45) Date of Patent: Jan. 12, 2016

(54) FUEL SURGE ARRESTOR

(71) Applicant: Garry Fox, Fort Pierce, FL (US)

(72) Inventor: Garry Fox, Fort Pierce, FL (US)

(73) Assignee: FOX ENVIRONMENTAL PRODUCTS, LLC, Fort Pierce, FL (US)

( * ) Notice: Subject to any disclaimer, the term of this patent is extended or adjusted under 35 U.S.C. 154(b) by 0 days.

(21) Appl. No.: 14/317,459

(22) Filed: Jun. 27, 2014

(65) Prior Publication Data

US 2015/0291408 A1 Oct. 15, 2015

Related U.S. Application Data

(63) Continuation-in-part of application No. 14/248,930, filed on Apr. 9, 2014.

(51) Int. Cl.
| | | |
|---|---|---|
| *B67C 11/00* | (2006.01) | |
| *B67C 11/02* | (2006.01) | |
| *B67D 7/04* | (2010.01) | |

(52) U.S. Cl.
CPC . *B67C 11/02* (2013.01); *B67D 7/04* (2013.01); *B67C 2011/30* (2013.01)

(58) Field of Classification Search
USPC ............... 141/285, 331–345, 350, 383–385; 285/377
See application file for complete search history.

(56) References Cited

U.S. PATENT DOCUMENTS

| | | | |
|---|---|---|---|
| 1,437,916 A | 12/1922 | Shelor | |
| 3,211,195 A * | 10/1965 | Porter | 141/337 |
| 3,291,165 A * | 12/1966 | Fraylick | 141/286 |
| 3,687,335 A | 8/1972 | Hunter | |
| 3,791,422 A | 2/1974 | Johnson et al. | |
| 3,885,606 A | 5/1975 | Krauss | |
| 3,893,918 A | 7/1975 | Favret, Jr. | |
| 4,031,294 A * | 6/1977 | Sano | 429/82 |
| 4,170,252 A * | 10/1979 | Peterson | 141/331 |
| 4,903,672 A | 2/1990 | MacKinnon | |
| 4,969,494 A * | 11/1990 | Chefson | 141/93 |
| 5,033,517 A * | 7/1991 | Bucci | 141/59 |
| 5,048,723 A * | 9/1991 | Seymour | 222/81 |
| 5,159,958 A * | 11/1992 | Sand | 137/888 |
| 5,377,728 A * | 1/1995 | McLeighton | 141/333 |
| 5,462,254 A | 10/1995 | Muller | |
| 5,472,025 A * | 12/1995 | Conrad et al. | 141/332 |
| 5,503,199 A | 4/1996 | Whitley, II et al. | |
| 5,571,249 A | 11/1996 | Boylen | |
| 5,715,876 A | 2/1998 | Burt | |
| 5,762,114 A | 6/1998 | Petersen | |

(Continued)

FOREIGN PATENT DOCUMENTS

| | | |
|---|---|---|
| EP | 0216240 A2 | 4/1987 |
| EP | 0927699 A1 | 7/1999 |

(Continued)

*Primary Examiner* — Timothy L Maust

(74) *Attorney, Agent, or Firm* — Kilpatrick Townsend & Stockton LLP

(57) ABSTRACT

A fuel surge arrestor can include a funnel shaped to fit within a fuel fill receptacle of a craft. The funnel can have a nozzle opening for accepting a fuel fill nozzle. A vent can be located at a top opening of the funnel. The vent can include a plurality of baffles that enable airflow within the vent while deterring heavy vapors and liquids from exiting the vent during a fuel surge. Various stems having different outer diameters designed to fit within various-sized fuel fill receptacles can be removably coupled to the funnel.

12 Claims, 14 Drawing Sheets

(56) References Cited

U.S. PATENT DOCUMENTS

| | | |
|---|---|---|
| 5,787,944 A | 8/1998 | Sarkis et al. |
| 5,878,795 A | 3/1999 | Armellino |
| 6,098,678 A * | 8/2000 | Shears .......................... 141/331 |
| 6,247,492 B1 | 6/2001 | Stuart |
| 6,609,870 B2 | 8/2003 | Williams et al. |
| 6,880,593 B1 | 4/2005 | Swane |
| 8,511,341 B2 | 8/2013 | Johnston |
| 8,522,838 B2 | 9/2013 | Gurtatowski |
| 8,555,937 B2 | 10/2013 | Murabayashi et al. |
| 2007/0256755 A1* | 11/2007 | King ............................. 141/340 |
| 2010/0065137 A1 | 3/2010 | Armellino |
| 2010/0236657 A1 | 9/2010 | Willey et al. |
| 2013/0078878 A1 | 3/2013 | Sayer |
| 2013/0292386 A1 | 11/2013 | Klauer et al. |
| 2013/0340890 A1 | 12/2013 | Matsuo et al. |

FOREIGN PATENT DOCUMENTS

| | | |
|---|---|---|
| EP | 1345811 B1 | 9/2003 |
| EP | 1676063 B1 | 7/2006 |
| EP | 2631211 A1 | 8/2013 |
| WO | 96/30252 A1 | 10/1996 |
| WO | 98/51610 A1 | 11/1998 |
| WO | 2013/043379 A1 | 3/2013 |
| WO | 2014/022083 A1 | 2/2014 |

* cited by examiner

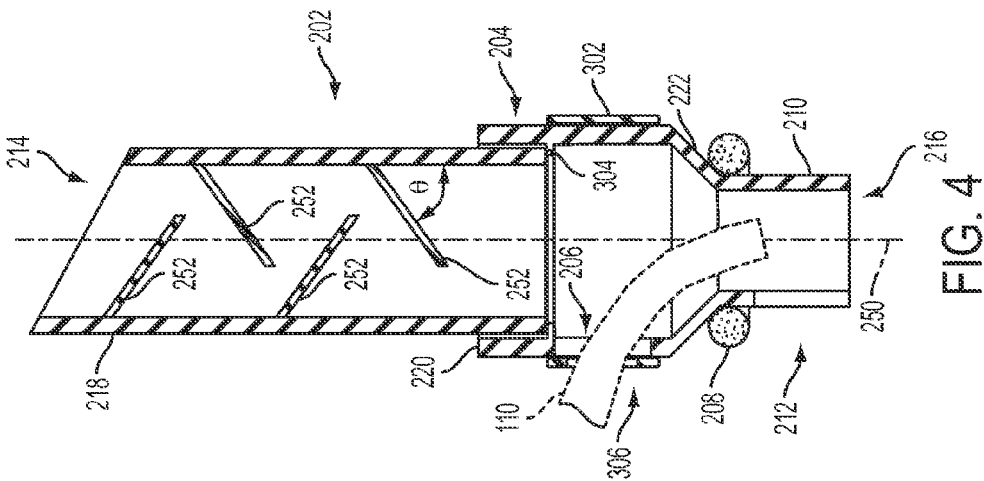
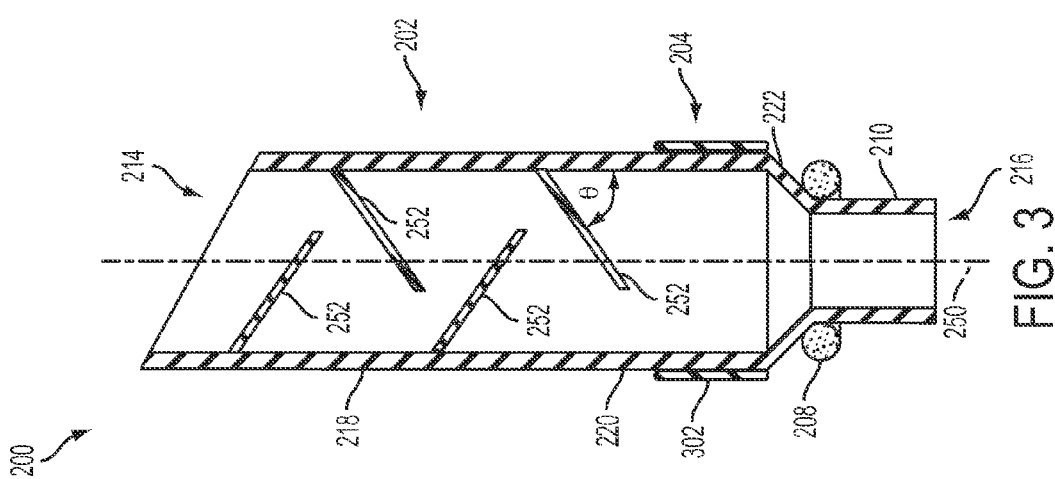

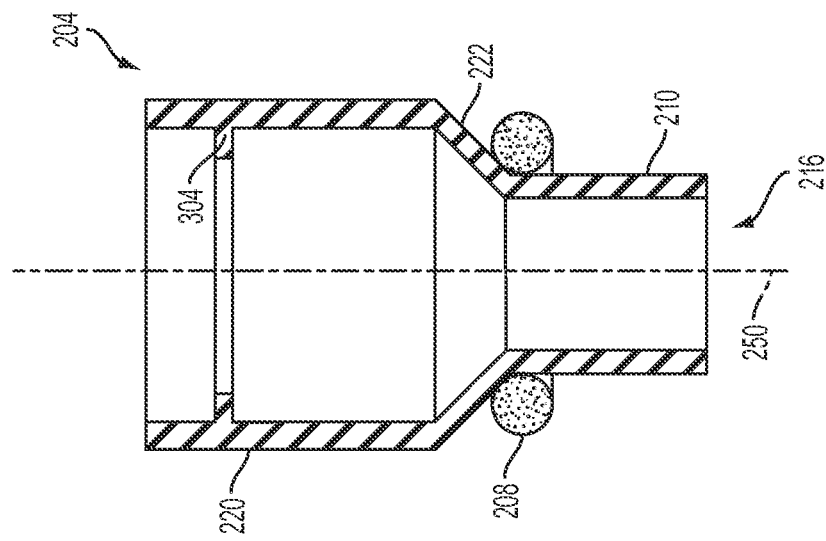
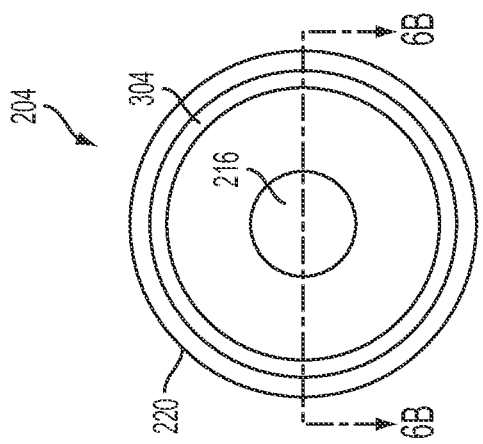
FIG. 6B
FIG. 6A

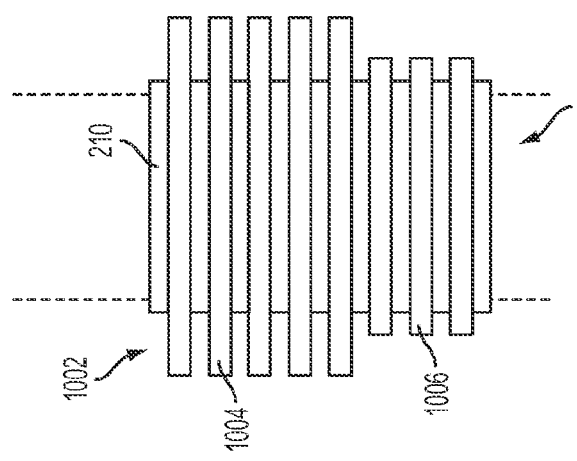
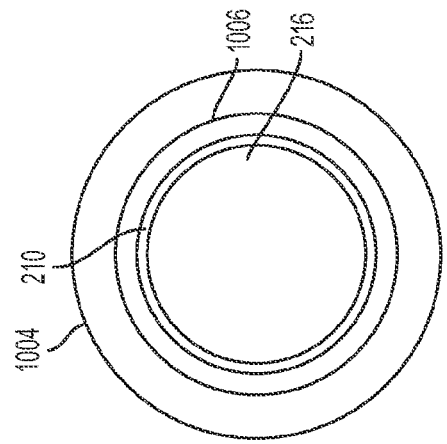
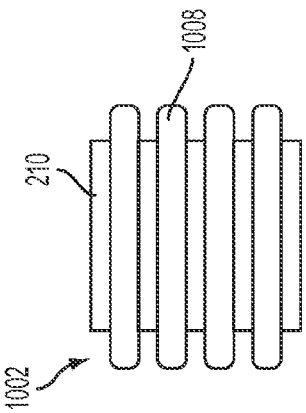
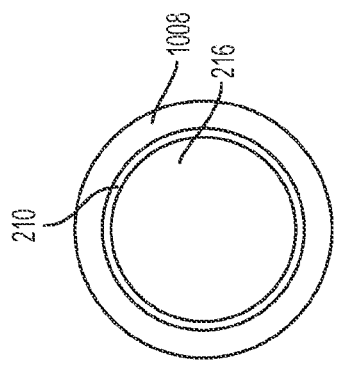
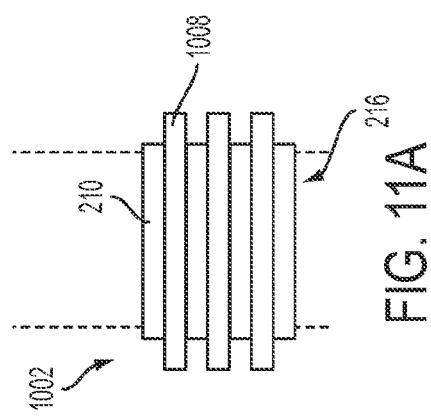

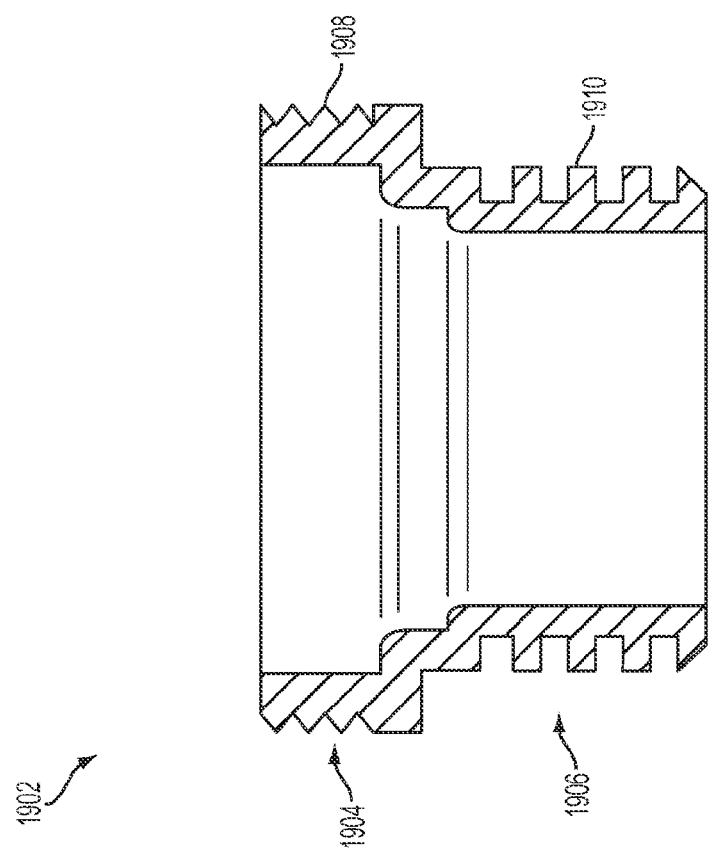
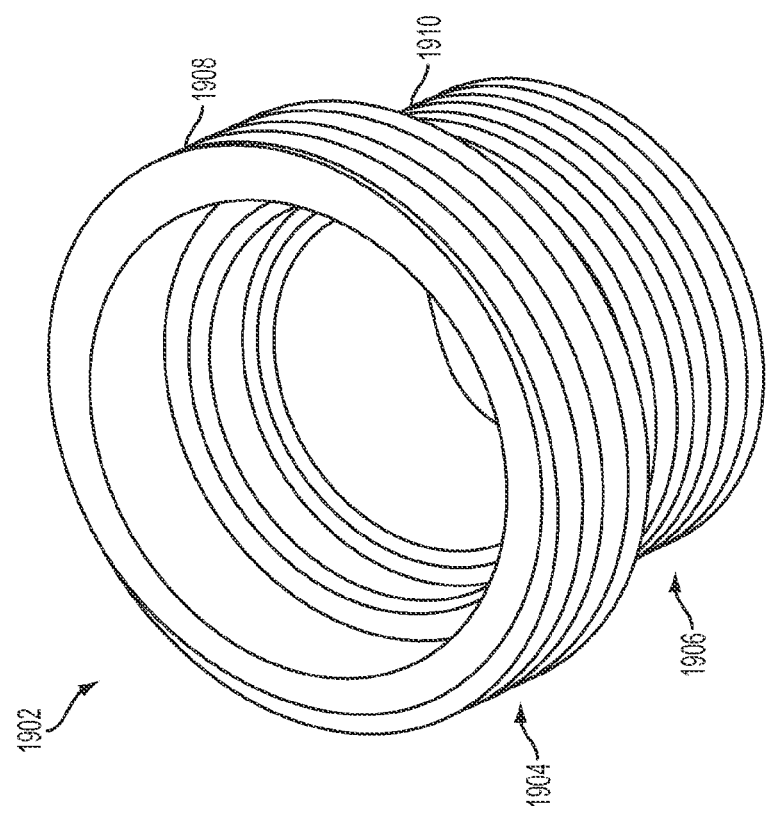

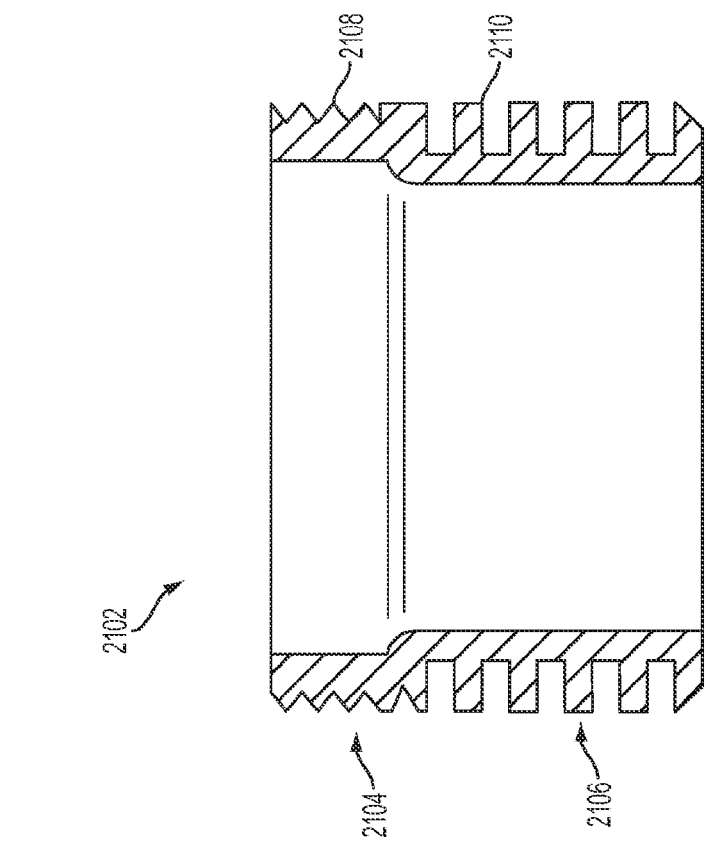
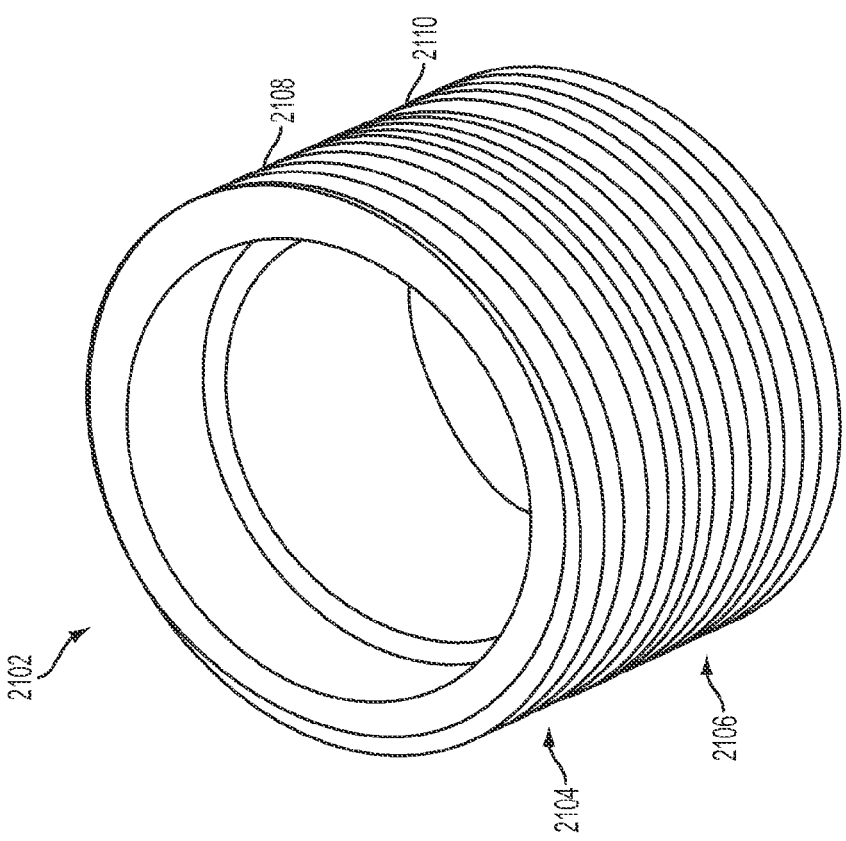

FUEL SURGE ARRESTOR

CROSS REFERENCE TO RELATED APPLICATIONS

The present application is a continuation in part of U.S. patent application Ser. No. 14/248,930 filed Apr. 9, 2014, entitled "FUEL SURGE ARRESTOR," the disclosure of which is hereby incorporated by reference in its entirety.

TECHNICAL FIELD

The present disclosure relates to fuel filling devices generally and more specifically to fuel filling devices for boating.

BACKGROUND

In boating and other activities using fuel-powered crafts (e.g., motorcycles, cars, etc.), fuel tanks must be refilled on occasion. Often, fuel tanks are refilled from fuel pumps, such as those found on land at standard pumping stations and those found near the water at marine piers. The fuel pumps generally pump fuel out through a nozzle that can be positioned within a fuel fill receptacle of the craft.

A common occurrence when refueling boats and other crafts is a back surge or "fuel surge," sometimes referred to as a "belch." The fuel surge is a surge of fuel and vapors that are expelled out of the fuel fill receptacle during refueling. In boating, the fuel surge can be especially problematic, because it can often result in spillage of fuel onto and over the side of the craft, potentially into surrounding water. Fuel surge results in waste, and more importantly, can cause environmental problems. To combat these environmental problems, many marine fuel filling stations supply boaters with supplies (e.g., paper towels and dispersant sprays) to clean up fuel spills, however these supplies can end up resulting in further waste and additional environmental problems. In addition to the loss of fuel during a fuel surge, loss of vapors can result in waste and environmental problems.

SUMMARY

Statements containing the term embodiment should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

A fuel surge arrestor is disclosed including a funnel and a vent which can be a unitary structure or separable structures. The funnel is shaped to fit within a fuel fill receptacle of a craft. The funnel can include nozzle opening for accepting a fuel fill nozzle. During a fuel surge, expelled fuel is expelled into the funnel and allowed to flow back into the fuel fill receptacle. The vent extends from the top of the funnel and can include a plurality of baffles that enable airflow within the vent while deterring heavy vapors and liquids from exiting the vent. During a fuel surge, expelled vapors can be lifted into the vent and blocked from exiting the vent by the baffles. Heavy vapors can then fall back into the fuel fill receptacle via the funnel.

BRIEF DESCRIPTION OF THE DRAWINGS

The specification makes reference to the following appended figures, in which use of like reference numerals in different figures is intended to illustrate like or analogous components

FIG. 3 is a cross-sectional view of a one-piece fuel surge arrestor according to one embodiment.

FIG. 4 is a cross-sectional view of a two-piece fuel surge arrestor according to one embodiment.

FIG. 6A is a top view of a funnel according to one embodiment.

FIG. 6B is a cross sectional view of the funnel of FIG. 6A taken along section 6B:6B according to one embodiment.

FIG. 10A is a side view of a stem having a ribbing section according to one embodiment.

FIG. 10B is a bottom view of the stem of FIG. 10A according to one embodiment.

FIG. 11A is a side view of a stem having a ribbing section according to one embodiment.

FIG. 11B is a bottom view of the stem of FIG. 11A according to one embodiment.

FIG. 12 is a side view of a stem having a ribbing section according to one embodiment.

FIG. 19 is a medium-sized removable stem according to one embodiment.

FIG. 20 is a cross-sectional view of the medium-sized removable stem of FIG. 19 according to one embodiment.

FIG. 21 is an axonometric projection of a large-sized removable stem according to one embodiment.

FIG. 22 is a cross-sectional view of the large-sized removable stem of FIG. 21 according to one embodiment.

DETAILED DESCRIPTION

A fuel surge arrestor is disclosed including a funnel and a vent which can be a unitary structure or separable structures. The funnel is shaped to fit within a fuel fill receptacle of a craft. The funnel can include nozzle opening for accepting a fuel fill nozzle. During a fuel surge, expelled fuel is expelled into the funnel and allowed to flow back into the fuel fill receptacle. The vent extends from the top of the funnel and can include a plurality of baffles that enable airflow within the vent while deterring heavy vapors and liquids from exiting the vent. During a fuel surge, expelled vapors can be lifted into the vent and blocked from exiting the vent by the baffles. Heavy vapors can then fall back into the fuel fill receptacle via the funnel.

The disclosed fuel surge arrestor can advantageously be easily placed on a fuel fill receptacle during a refueling process and easily removed once refueling is complete. Being a portable device, the disclosed fuel surge arrestor can be easily moved between multiple boats, allowing an owner of multiple crafts to use the fuel surge arrestor on multiple crafts, or allowing a refueling station operator to keep a fuel surge arrestor on hand to use with customers. In some embodiments, various parts can be easily disassembled in order to clean the fuel surge arrestor.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

As used herein, the terms "bottom," "top," "down," and "up" are used only to aid in explanation of the accompanying figures and are not to intended to limit the specification or claims in any way.

Figure 1:
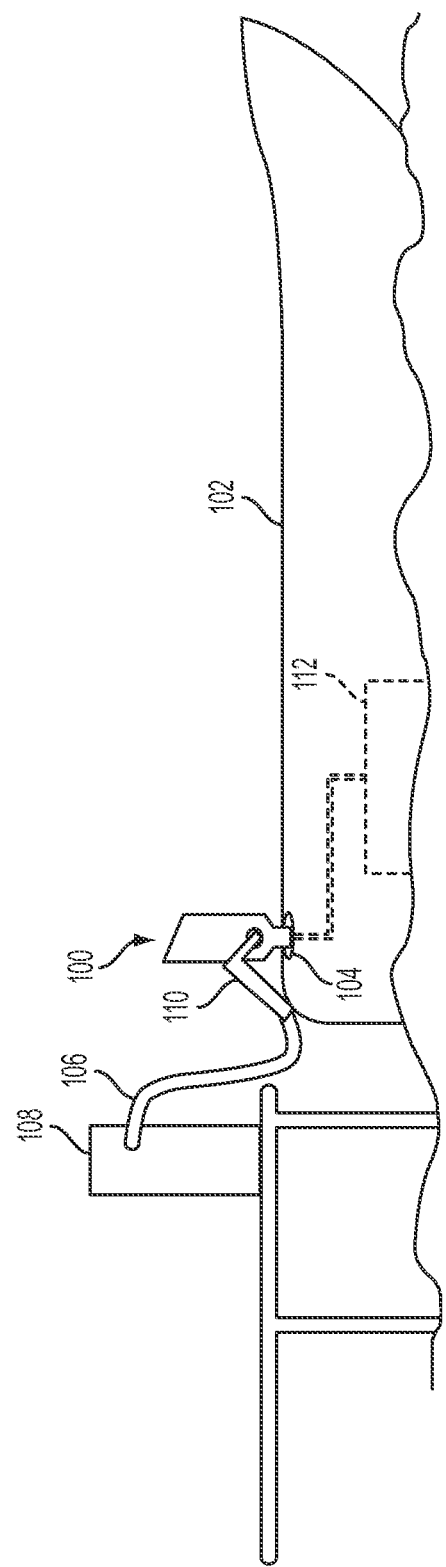
FIG. 1 is a schematic view of a pier-mounted fuel pump refilling a fuel tank of a boat using a fuel surge arrestor according to one embodiment.

FIG. 1 is a schematic view of a pier-mounted fuel pump 108 refilling a fuel tank of a boat 102 using a fuel surge arrestor 100 according to one embodiment. The fuel surge arrestor 100 is placed within a fuel fill receptacle 104 of the boat 102. The fuel fill receptacle 104 is connected to a fuel tank 112. A fuel surge arrestor 100 can be used with different fuel fill receptacles of different crafts other than boats 102, such as motorcycles, cars, trucks, ATVs, lawnmowers, tractors, and other fuel-powered crafts. A fuel surge arrestor 100 can be used to refuel any such crafts at any refueling stations or remote locations where fuel is pumped (e.g., automatically or manually) or poured into a fuel tank 112 of the craft.

The fuel pump 108 can include a fuel fill nozzle 110 attached by a hose 106. The fuel fill nozzle 110 can be designed to be placed within and to dispense fuel directly into a fuel fill receptacle 104 during standard refueling operations. However, as shown in FIG. 1, the fuel surge arrestor 100 can be positioned to accept the fuel fill nozzle 110 and direct dispensed fuel into the fuel fill receptacle 104, as described in further detail below.

Figure 2B:
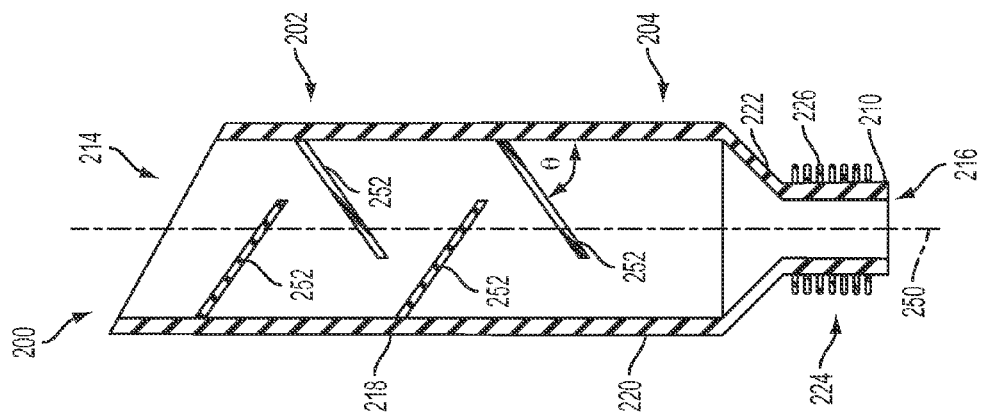
FIG. 2B is a cross-sectional view of the one-piece fuel surge arrestor of FIG. 2A according to one embodiment.
Figure 2A:
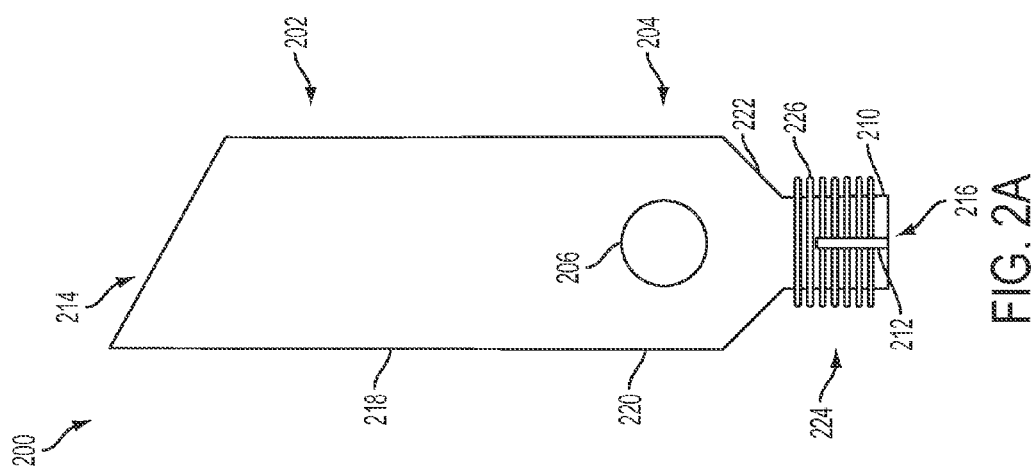
FIG. 2A is a front view of a one-piece fuel surge arrestor according to one embodiment.

FIG. 2A is a front view of a one-piece fuel surge arrestor 200 according to one embodiment. The one-piece fuel surge arrestor 200 is denoted as "one-piece" because the funnel 204 and vent 202 are not separable. The funnel 204 and vent 202 of this one-piece fuel surge arrestor 200 can be made of one part (e.g., formed from a single piece of material) or can be made of multiple parts attached together (e.g., welded, glued, or otherwise permanently joined together).

The vent 202 can include a top opening 214 through which air may enter (e.g., in a direction going down as seen in FIG. 2A). The funnel 204 can include a nozzle opening 206 shaped to accept a fuel fill nozzle 110. In some alternate embodiments, the nozzle opening 206 is located in the vent 202 instead of the funnel 204.

The vent 202 can have a vent wall 218 having a vent wall diameter. The funnel 204 can have a funnel wall 220 having a top diameter at the top end of the funnel 204 and a stem 210 having a stem diameter. The top end of the funnel 204 can be separated from the stem 210 by a reducing section 222. The top diameter can be larger than the stem diameter. The stem diameter can be sized to fit within a fuel fill receptacle 104. The stem diameter can be slightly smaller than 1.5 inches to fit a fuel fill receptacle 104 having a 1.5 inch inner diameter. The stem diameter can be slightly smaller than 2 inches to fit a fuel fill receptacle 104 having a 2 inch inner diameter. The stem diameter can be sized to fit within a desired fuel fill receptacle 104.

In some embodiments, the funnel 204 can include interchangeable stems 210 of different lengths and diameters appropriately sized to fit within the desired fuel fill receptacle 104. In some embodiments, the funnel 204 can include adaptors to adapt a stem 210 designed to fit within a fuel fill receptacle 104 having a particular inner diameter to fit within a fuel fill receptacle 104 having a different inner diameter.

The stem 210 can include a ribbing section 224 having one or more ribbing elements 226. The ribbing elements 226 can be a slightly pliable or very pliable materials, such as rubber, plastic, silicone, or other suitable material. As the stem 210 is inserted into a fuel fill receptacle 104, the ribbing elements 226 can flex to allow insertion. The ribbing elements 226 can engage features of the fuel fill receptacle 104, such as threads. During removal of the stem 210 from the fuel fill receptacle 104, the ribbing elements 226 can flex to allow removal. In embodiments where the stem 210 includes a cap slit 212, as described in further detail below, the ribbing elements 226 can include corresponding slits.

The funnel 204 can include a nozzle opening 206 in the funnel wall 220. The nozzle opening 206 can be sized to accept a fuel fill nozzle 110. The nozzle opening 206 can be circular or any other shape capable of accepting a fuel fill nozzle 110. The nozzle opening 206 can be shaped to facilitate insertion of the fuel fill nozzle 110 so the distal end of the fuel fill nozzle 110 points towards the bottom of the funnel 204.

Often, fuel fill receptacles 104 are covered by a fuel fill receptacle cap that is attached to, near, or within the fuel fill receptacle 104 by a tether (e.g., a chain). The stem 210 can optionally include a cap slit 212. The cap slit 212 can be shaped to accept the tether of a fuel fill receptacle cap, allowing the funnel 204 to sit as completely within the fuel fill receptacle 104 in the event the tether of a fuel fill receptacle cap must pass from within the fuel fill receptacle 104 to outside the fuel fill receptacle 104 during fueling.

FIG. 2B is a cross-sectional view of the one-piece fuel surge arrestor 200 of FIG. 2A according to one embodiment. The fuel surge arrestor 200 has a center axis 250. The vent 202 and funnel 204 define a pathway from the top opening 214, through the vent 202 and the funnel 204, and out of the bottom opening 216.

Arranged within the vent 202 of the fuel surge arrestor 200 lies one or more baffles 252. Baffles 252 can be arranged to allow fluid flow through the pathway, while catching and/or resisting certain fluid flow from the bottom opening 216, up through the pathway, and out the top opening 214. In one embodiment, the baffles 252 can be arranged to allow air to flow through the pathway, but catch liquid and/or heavy vapors that may be expelled upwards through the bottom opening 216 during a fuel surge.

Each baffle 252 can be a unitary structure with the vent wall 218, can be permanently attached to the vent wall 218 (e.g., welded or adhered), or can be removably attached to the vent wall 218 (e.g., the baffle 252 can slide into a slit in the vent wall 218). In alternate embodiments, the baffles 252 are attached to a frame that is positionable within the vent 202. As used herein, the term "extending from" and variations thereof are used to describe the general direction of a dimension (e.g., length, width, or other) of a feature and does not limit the feature from being attached to or formed from any other feature.

Each baffle 252 can extend from the vent wall 218 at an angle θ. The angle θ can be less than 90° (i.e., the baffle 252 can extend from the vent wall 218 at an angle generally towards the funnel 204). In some embodiments, the angle θ can be between approximately 20° and approximately 25°. In some embodiments, the angle θ can be 75° or less. Each baffle 252 can extend from the vent wall 218 at approximately the same angle or at angles different from one another.

Each baffle 252 can extend from the vent wall 218 to partially occlude the pathway. When multiple baffles 252 are used, each baffle 252 can be offset such that two or more baffles 252 overlap one another. Each baffle 252 can extend at least beyond the center axis 250 of the vent 202. Each baffle 252 can extend to occlude at least 55% of the pathway through the vent 202. Each baffle 252 can extend to occlude at least two-thirds of the pathway through the vent 202.

Each baffle 252 can be planar in shape. In alternate embodiments, each baffle 252 can have different shapes (e.g., wing-shaped, corrugated, or other shapes).

FIG. 3 is a cross-sectional view of a one-piece fuel surge arrestor 200 according to one embodiment. The stem 210 of the fuel surge arrestor 200 of FIG. 3 is shown having a larger diameter than the stem 210 of the fuel surge arrestor 200 of FIG. 2. In some embodiments, an elastic sleeve 302 can be positioned around the funnel wall 220. The elastic sleeve 302 can help retain the fuel fill nozzle 110 and for other purposes, as described in further detail below.

A gasket 208 can be placed around the stem 210 and/or reducing section 222. The gasket 208 can help seal the funnel 204 with the fuel fill receptacle 104. The gasket 208 can be rubber or any other suitable material. In some embodiments, the gasket 208 can be a ribbed rubber insert. In alternate embodiments, no gasket 208 is used, and instead a ribbed section is used, as described in further detail herein.

FIG. 4 is a cross-sectional view of a two-piece fuel surge arrestor 200 according to one embodiment. The fuel surge arrestor 200 includes a funnel 204 and vent 202 that are separate parts. The vent 202 can sit within the funnel 204 and be placed on a shoulder 304 of the funnel 204.

The funnel 204 can include a nozzle opening 206. A fuel fill nozzle 110 is shown in dotted lines. The elastic sleeve 302 is shown having a sleeve opening 306 positioned at the nozzle opening 206. The sleeve opening 306 is sized to accept a fuel fill nozzle 110. Due to the elastic nature of the elastic sleeve 302, the sleeve opening 306 can stretch to best accept the fuel fill nozzle 110 and to reduce the chance that any fluids may escape out of the nozzle opening 206. The elastic sleeve 302 can be made of rubber, plastic, or any other suitable material. In alternate embodiments, other elastic elements can be included in or around the nozzle opening 206.

In some embodiments, the funnel 204 does not include a shoulder 304. In alternate embodiments, the vent 202 can include a feature that ensures the vent wall 218 does not occlude the nozzle opening 206. In some alternate embodiments, the vent wall 218 also includes an opening which aligns with the nozzle opening 206 to allow a fuel fill nozzle 110 to pass through the vent wall 218 when the fuel fill nozzle 110 is inserted through the nozzle opening 206.

Figure 5B:
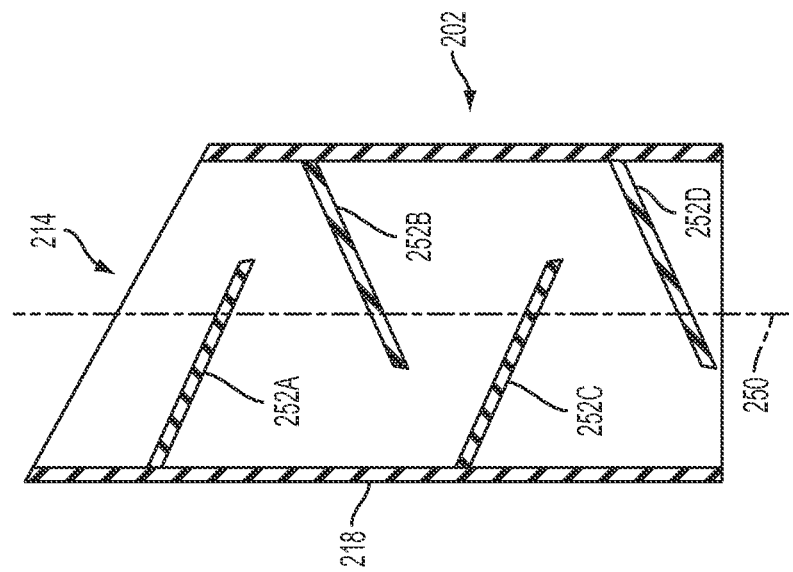
FIG. 5B is a cross sectional view of the vent of FIG. 5A taken along section 5B:5B according to one embodiment.
Figure 5A:
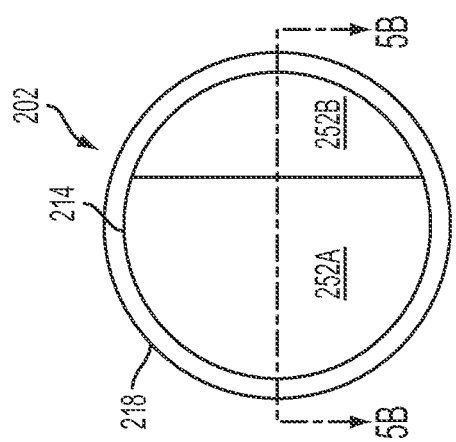
FIG. 5A is a top view of a vent according to one embodiment.

FIG. 5A is a top view of a vent 202 according to one embodiment. The vent wall 218 is shown having a top opening 214. A first baffle 252A is shown partially occluding the pathway through the vent 202 and partially overlapping a second baffle 252B. The first baffle 252A and second baffle 252B together fully occlude a direct, line-of-sight pathway through the vent 202. In alternate embodiments, three or more baffles 252 can be used in concert to fully occlude a direct, line-of-sight pathway through the vent 202. In alternate embodiments, one or more baffles 252 used together can occlude most, but not all, of a direct, line-of-sight pathway through the vent 202.

FIG. 5B is a cross sectional view of the vent 202 of FIG. 5A taken along section 5B:5B according to one embodiment. The first baffle 252A and second baffle 252B are visible through the top opening 214. The third baffle 252C and fourth baffle 252D are present below the first baffle 252A and second baffle 252B.

FIG. 6A is a top view of a funnel 204 according to one embodiment. The funnel wall 220 includes a shoulder 304 upon which a vent 202 can be placed. The funnel 204 includes a bottom opening 216.

FIG. 6B is a cross sectional view of the funnel 204 of FIG. 6A taken along section 6B:6B according to one embodiment. The shoulder 304 is shown upon which a vent 202 can be placed.

Figure 7:
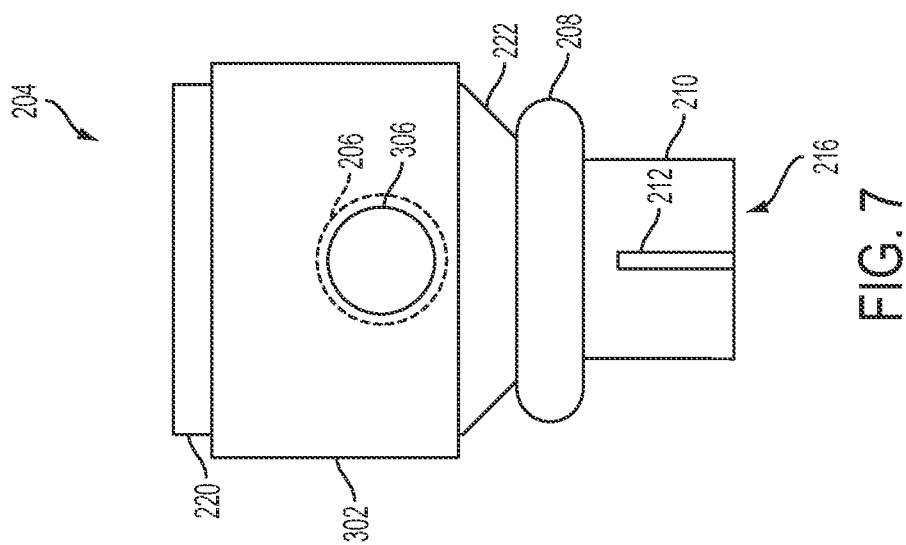
FIG. 7 is a front view of a funnel having a nozzle opening according to one embodiment.

FIG. 7 is a front view of a funnel 204 having a nozzle opening 206 according to one embodiment. The funnel 204 includes an optional elastic sleeve 302. The elastic sleeve 302 has a sleeve opening 306 that aligns with the nozzle opening 206 in the funnel 204. The sleeve opening 306 can be smaller than the nozzle opening 206. In alternate embodiments, the sleeve opening 306 is the same size or larger than the nozzle opening 206.

In some embodiments, an insert can be located within the nozzle opening 206 to help with placing a fuel fill nozzle 110 into the funnel 204. The insert can be rubber, plastic, or other suitable material.

Figure 8:
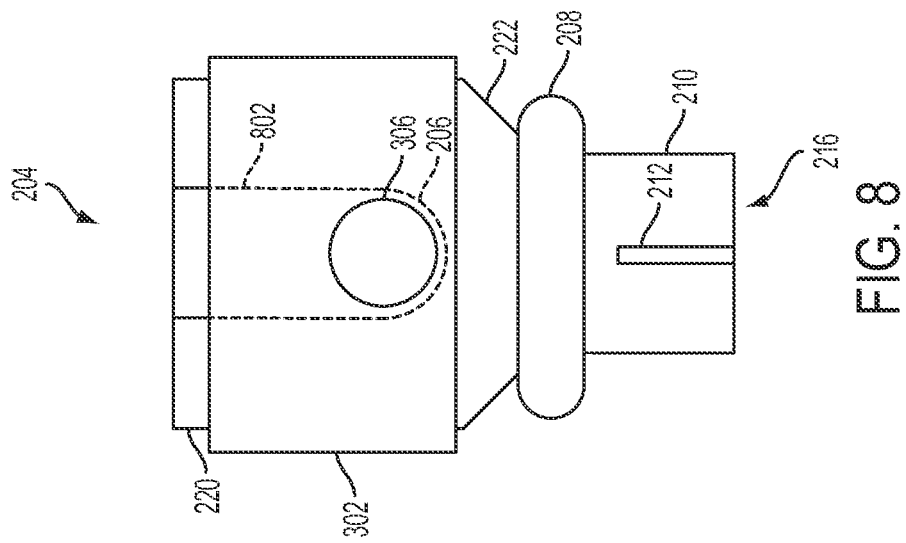
FIG. 8 is a front view of a funnel having a nozzle opening and a slit according to one embodiment.

FIG. 8 is a front view of a funnel 204 having a nozzle opening 206 and a slit 802 according to one embodiment. The slit 802 can allow the funnel wall 220 to flex radially outwards. In some embodiments, the vent 202 can be held in place in the funnel 204 by a friction fit between the funnel wall 220 and the vent wall 218. In some embodiments, the slit 802 allows the funnel wall 220 to flex outwards sufficiently to allow a vent 202 to be placed inside the funnel 204. Once the vent 202 is placed into the funnel 204, the elastic sleeve 302 can be placed around the funnel 204 to further secure the vent 202 within the funnel 204 and to provide a smaller opening through which a fuel fill nozzle 110 can be inserted.

In some embodiments, an insert can be located within the nozzle opening 206 and/or the slit 802 to help with placing a fuel fill nozzle 110 into the funnel 204. The insert can be rubber, plastic, or other suitable material. In some embodiments, the insert can act as a shoulder that keeps the vent wall 218 from occluding the nozzle opening 206.

Figure 9B:
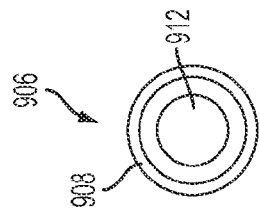
FIG. 9B is a top view of the insert of FIG. 9A according to one embodiment.
Figure 9C:
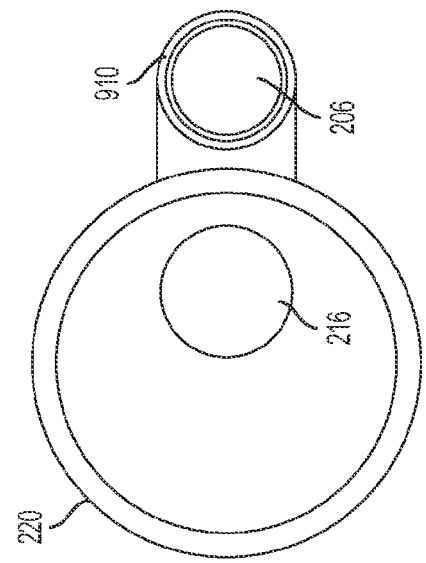
FIG. 9C is a top view of the funnel of FIG. 9A according to one embodiment.
Figure 9A:
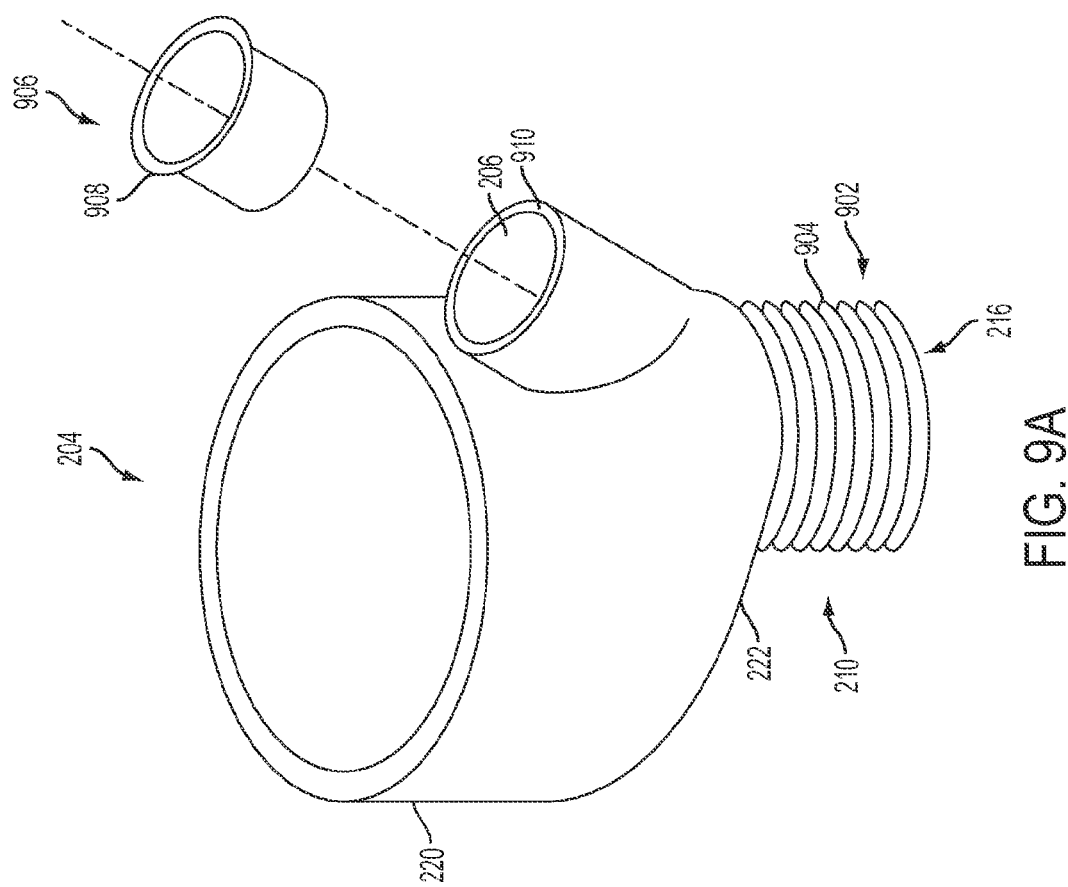
FIG. 9A is a partially-exploded view of a funnel including an offset stem.

FIG. 9A is a partially-exploded view of a funnel 204 including an offset stem 210 according to one embodiment. The funnel 204 includes a funnel wall 220 having a reducing section 222 and a nozzle opening 206. The funnel 204 includes a stem 210 with a bottom opening 216. The funnel 204 can include a stem 210 that is offset from the center of the reducing section 222. Additionally, the nozzle opening 206 can be positioned to direct a fuel fill nozzle 110 into the stem 210. The nozzle opening 206 can be angled to position a fuel fill nozzle 110 so that the tip of the nozzle points out the bottom opening 216 of the funnel 204. The stem 210 can include a ribbing section 902. The ribbing section 902 can include one or more ribbing elements 904 of uniform or varying shapes or diameters, as described in further detail below.

The nozzle opening 206 can include an insert 906. The insert 906 can be shaped to rest within the nozzle opening 206. The insert 906 can include a lip 908 that rests upon a rim 910 of the nozzle opening 206. The insert 906 can be made of a flexible material, such as rubber, silicone, or any other suitable material. The insert 906 can be permanently adhered to or fused to the nozzle opening 206, or can be removably placed within the nozzle opening 206. The insert 906 can include an insert hole 912 through which a fuel fill nozzle 110 can be placed. The insert 906 and the insert hole 912 can flex to tightly fit various sizes and shapes of fuel fill nozzles 110.

FIG. 9B is a top view of the insert 906 of FIG. 9A according to one embodiment. The insert 906 includes a lip 908 that rests on the rim 910 of the nozzle opening 206. The insert 906 includes an insert hole 912.

FIG. 9C is a top view of the funnel 204 of FIG. 9A according to one embodiment. The funnel 204 includes bottom opening 216. The funnel 204 includes a funnel wall 220 and a nozzle opening 206 having a rim 910.

FIG. 10A is a side view of a stem 210 having a ribbing section 1002 according to one embodiment. The stem 210 can include a ribbing section 1002 that includes one or more first ribbing elements 1004 and one or more second ribbing elements 1006. The first ribbing elements 1004 are located further from the bottom opening 216 of the stem 210 and have a larger diameter than the second ribbing elements 1006. The second ribbing elements 1006 are located closer to the bottom opening 216. The use of the first ribbing elements 1004 of a larger diameter than the second ribbing elements 1006 allow for the stem 210 to form tight seals when inserted into fuel fill receptacles 104 having a range of inner diameters, such as between about 1.75 inches to about 2.25 inches. In smaller fuel fill receptacles 104, the second ribbing elements 1006 can create a tight seal while the first ribbing elements 1004 may not be inserted into the fuel fill receptacle 104. In larger fuel fill receptacles 104, the first ribbing elements 1004 can create a tight seal while the second ribbing elements 1006 create a loose seal or no seal within the fuel fill receptacle 104.

In some embodiments, the ribbing elements 1004, 1006 can form a tight seal with the fuel fill receptacle 104 by engaging features of the fuel fill receptacle 104, such as threads.

In some embodiments, a plurality of ribbing elements of varying shapes and diameters can be used to provide tight seals with a plurality of fuel fill receptacles 104 having varying inner diameters.

In some embodiments, the ribbing elements 1004, 1006 can be attached to the stem 210. In alternate embodiments, the ribbing elements 1004, 1006 can be attached to a sleeve that fits around the stem and can be held in place by adhesion, fusing, friction, or other suitable ways. In some embodiments, a user can select the appropriate sleeve having a ribbing section 1002 designed for certain desired fuel fill receptacle 104 diameters and install that sleeve on the stem 210 of that user's funnel 204.

FIG. 10B is a bottom view of the stem 210 of FIG. 10A according to one embodiment. The stem 210 includes a bottom opening 216.

FIG. 11A is a side view of a stem 210 having a ribbing section 1002 according to one embodiment. The stem 210 can include a ribbing section 1002 that includes one or more ribbing elements 1008. The use of a single set of ribbing elements 1008 allow for the stem 210 to form tight seals when inserted into fuel fill receptacles 104 having inner diameters around a particular diameter, such as diameters around approximately 1.50 inches.

In some embodiments, the ribbing elements 1008 can be attached to the stem 210. In alternate embodiments, the ribbing elements 1008 can be attached to a sleeve that fits around the stem and can be held in place by adhesion, fusing, friction, or other suitable ways. In some embodiments, a user can select the appropriate sleeve having a ribbing section 1002 designed for certain desired fuel fill receptacle 104 diameters and install that sleeve on the stem 210 of that user's funnel 204.

FIG. 11B is a bottom view of the stem of FIG. 11A according to one embodiment. The stem 210 includes a bottom opening 216.

FIG. 12 is a side view of a stem 210 having a ribbing section 1002 according to one embodiment. The ribbing section 1002 can have ribbing elements 1008 having a cross-section that is oval in shape. In alternate embodiments, the ribbing section 1002 can have ribbing elements 1004, 1006, 1008 having a cross-section that is square, rounded, or any other suitable shape.

Figure 13:
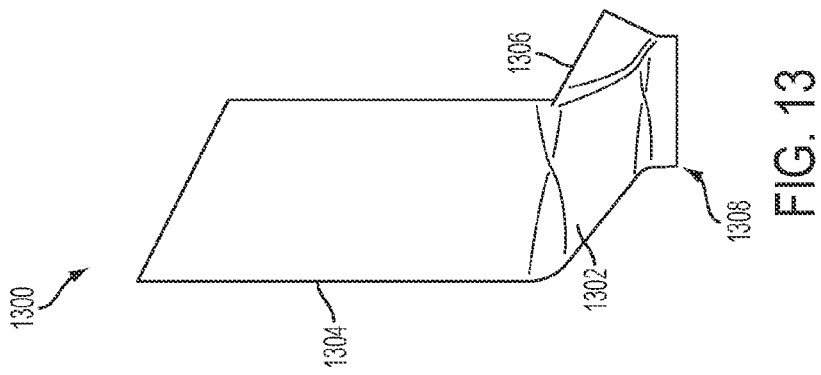
FIG. 13 is a side view of a fuel surge arrestor according to one embodiment.

FIG. 13 is a side view of a fuel surge arrestor 1300 according to one embodiment. The fuel surge arrestor 1300 includes a funnel portion 1302 (e.g., a funnel) and a vent portion 1304 (e.g., a vent). The funnel portion 1302 includes a nozzle opening 1306 offset from a centerline of the vent portion 1304. The vent portion 1304 contains one or more baffles, as described above.

The funnel portion 1302 can include a stem receptacle 1308 designed to accept a removable stem, as described in further detail below.

Figure 14:
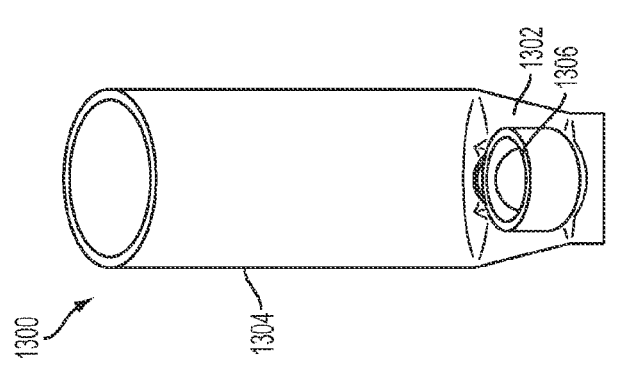
FIG. 14 is a front view of the fuel surge arrestor of FIG. 13 according to one embodiment

FIG. 14 is a front view of the fuel surge arrestor 1300 of FIG. 13 according to one embodiment. The funnel portion 1302 includes the nozzle opening 1306 and the stem receptacle 1308. The fuel surge arrestor 1300 also includes a vent portion 1304.

Figure 15:
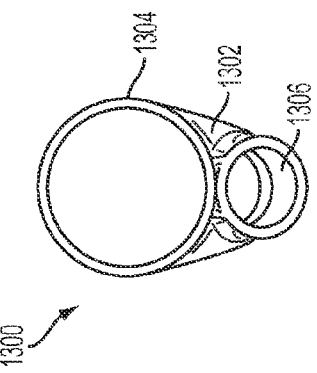
FIG. 15 is a top view of the fuel surge arrestor of FIG. 13 according to one embodiment.

FIG. 15 is a top view of the fuel surge arrestor 1300 of FIG. 13 according to one embodiment. The funnel portion 1302 includes the nozzle opening 1306 and the stem receptacle 1308. The fuel surge arrestor 1300 also includes a vent portion 1304.

Figure 16:
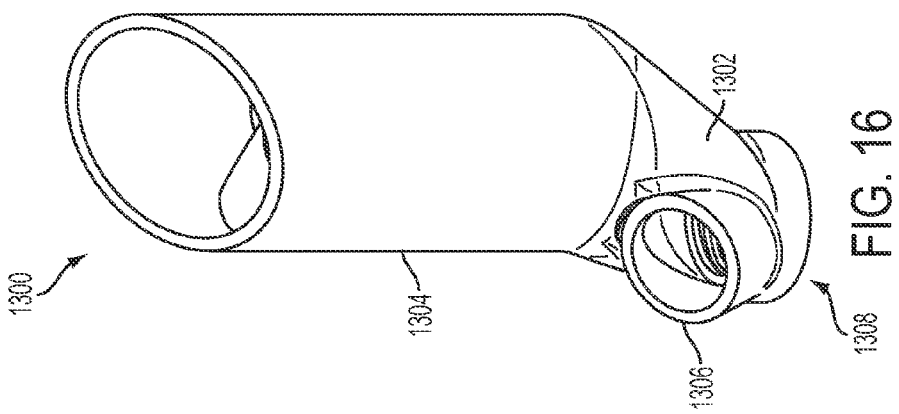
FIG. 16 is an axonometric view of the fuel surge arrestor of FIG. 13 according to one embodiment.

FIG. 16 is an axonometric view of the fuel surge arrestor 1300 of FIG. 13 according to one embodiment. The funnel portion 1302 includes the nozzle opening 1306 and the stem receptacle 1308. The fuel surge arrestor 1300 also includes a vent portion 1304.

Figure 17:
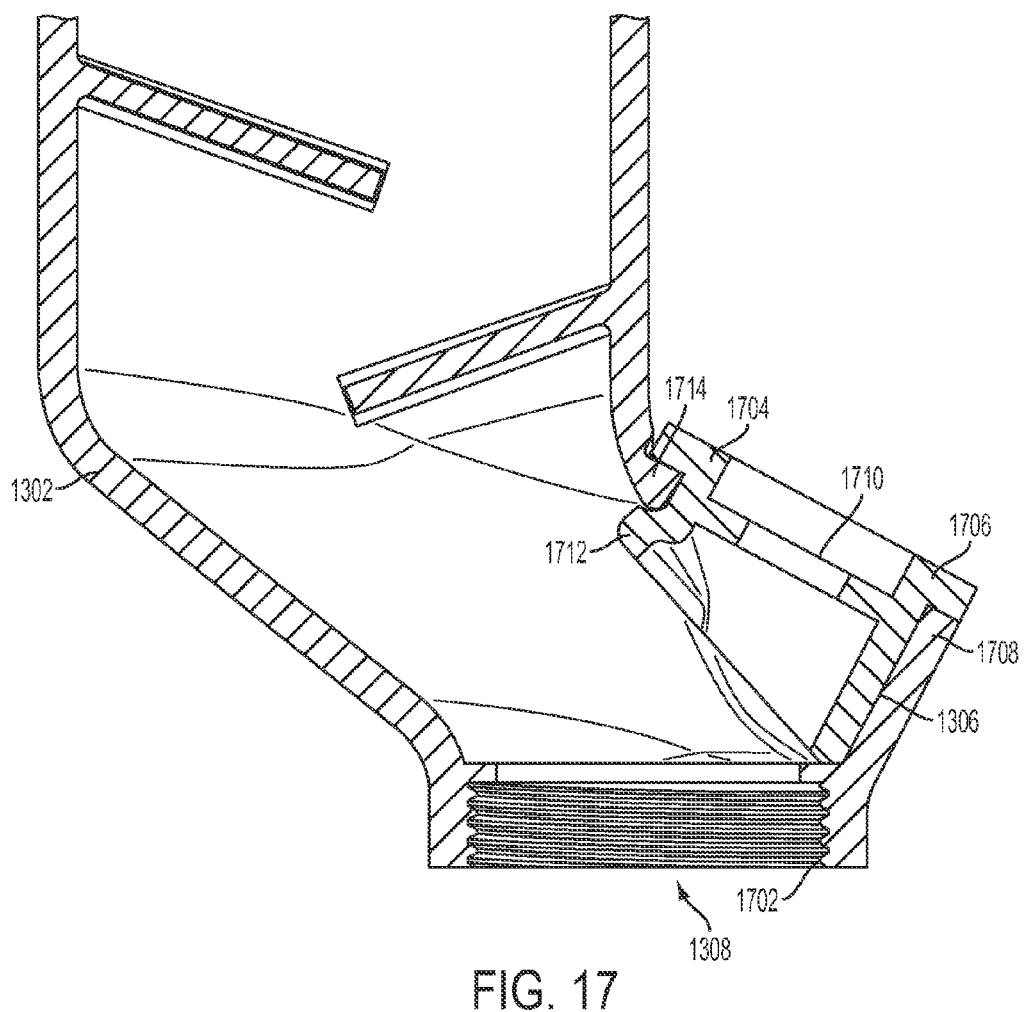
FIG. 17 is a cross-sectional view of a funnel portion according to one embodiment.

FIG. 17 is a cross-sectional view of a funnel portion 1302 according to one embodiment. The funnel portion 1302 includes stem receptacle 1308. Stem receptacle 1308 can include threading 1702 onto which a stem can be thread, as described in further detail below. A stem receptacle 1308 can retain a stem in other manners, such as through a press-fit interface, through the use of a set screw, or by other suitable mechanism.

As used herein, the stem receptacle 1308 is shown and described with internal threading for accepting a stem with external threading. In alternate embodiments, the stem receptacle 1308 can include external threading that engages internal threading of a stem.

The funnel portion 1302 includes a nozzle opening 1306 into which an insert 1704 can be placed. The insert 1704 can include a lip 1706 that rests on the rim 1708 of the nozzle opening 1306. The insert 1704 also includes an insert hole 1710 through which a nozzle may be placed. In some embodiments, the insert 1704 additionally includes a clip portion 1712 that can clip onto the rim 1708 of the nozzle opening 1306 to provide protection against the insert 1704 falling out of the nozzle opening 1306. The insert 1704 can be any insert, as described above in further detail.

Figure 18:
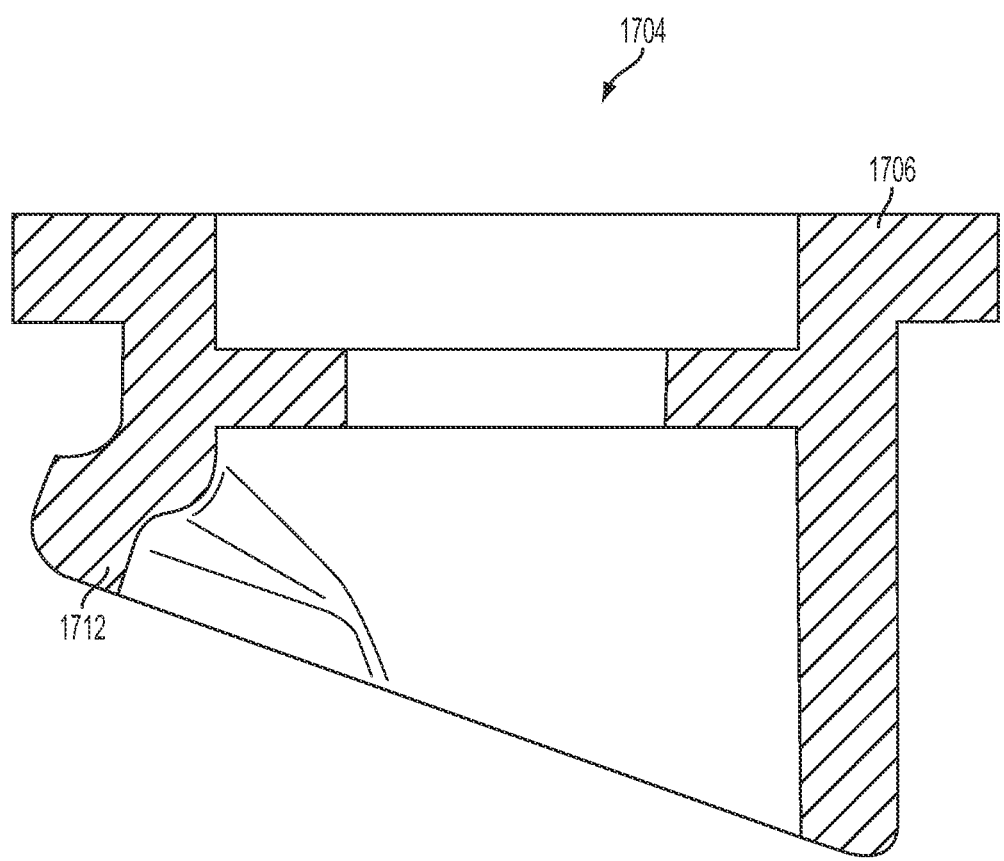
FIG. 18. is a side view of the insert of FIG. 17 according to one embodiment.

FIG. 18. is a side view of the insert 1704 of FIG. 17 according to one embodiment. The insert 1704 can include a lip 1706 and a clip portion 1712.

FIG. 19 is a axonometric projection of a medium-sized removable stem 1902 according to one embodiment. The removable stem 1902 can include a funnel attachment portion 1904 and an insertable portion 1906. The funnel attachment portion 1904 can include an attachment mechanism for securing the removable stem 1902 to the funnel portion 1302. As seen in FIG. 19, the attachment mechanism can be threading 1908 designed to engage the threading 1702 on the stem receptacle 1308. Other suitable attachment mechanisms can be used. The insertable portion 1906 can include ribbing elements 1910, such as the ribbing elements described above. The medium-sized removable stem 1902 can have an insertable portion 1906 that is a medium-sized diameter A removable stem 1902 can allow a user to select the desired size stem that best fits the fuel tank of the vehicle being refueled. A user can easily remove an undesirable removable stem and attach the desired removable stem. Threading 1908 of the removable stem 1902 and corresponding threading 1702 of the stem receptacle 1308 allow the removable stem to be removed from and attached to the funnel portion 1302 without the need for tools or other equipment.

FIG. 20 is a cross-sectional view of the medium-sized removable stem 1902 of FIG. 19 according to one embodiment. The removable stem 1902 includes a funnel attachment portion 1904 with threading 1908 and an insertable portion 1906 with ribbing elements 1910. The insertable portion 1906 can have an external diameter, including ribbing elements 1910, of about 1.875 inches (e.g., between about 1.80 and about 1.95 inches). The insertable portion 1906 can have an external diameter, not including ribbing elements 1910, of about 1.625 inches (e.g., between about 1.56 and about 1.69 inches).

FIG. 21 is an axonometric projection of a large-sized removable stem 2102 according to one embodiment. The removable stem 2102 can include a funnel attachment portion 2104 and an insertable portion 2106. The funnel attachment portion 2104 can include threading 2108 for securing the removable stem 2102 to the funnel portion 1302. Other suitable attachment mechanisms can be used, as described above. The insertable portion 2106 can include ribbing elements 2110, such as the ribbing elements described above.

FIG. 22 is a cross-sectional view of the large-sized removable stem 2102 of FIG. 21 according to one embodiment. The removable stem 2102 includes a funnel attachment portion 2104 with threading 2108 and an insertable portion 2106 with ribbing elements 2110. The insertable portion 2106 can have an external diameter, including ribbing elements 2110, of about 2.375 inches (e.g., between about 2.28 and about 2.47 inches). The insertable portion 2106 can have an external diameter, not including ribbing elements 2110, of about 2.00 inches (e.g., between about 1.92 and about 2.08 inches).

Figure 23:
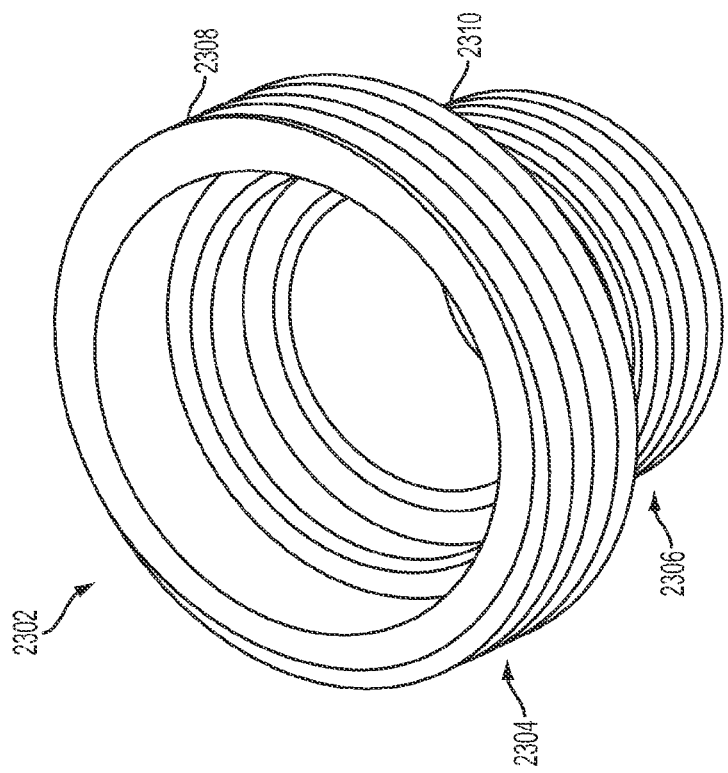
FIG. 23 is an axonometric projection of a small-sized removable stem according to one embodiment.

FIG. 23 is an axonometric projection of a small-sized removable stem 2302 according to one embodiment. The removable stem 2302 can include a funnel attachment portion 2304 and an insertable portion 2306. The funnel attachment portion 2304 can include threading 2308 for securing the removable stem 2302 to the funnel portion 1302. Other suitable attachment mechanisms can be used, as described above. The insertable portion 2306 can include ribbing elements 2310, such as the ribbing elements described above.

Figure 24:
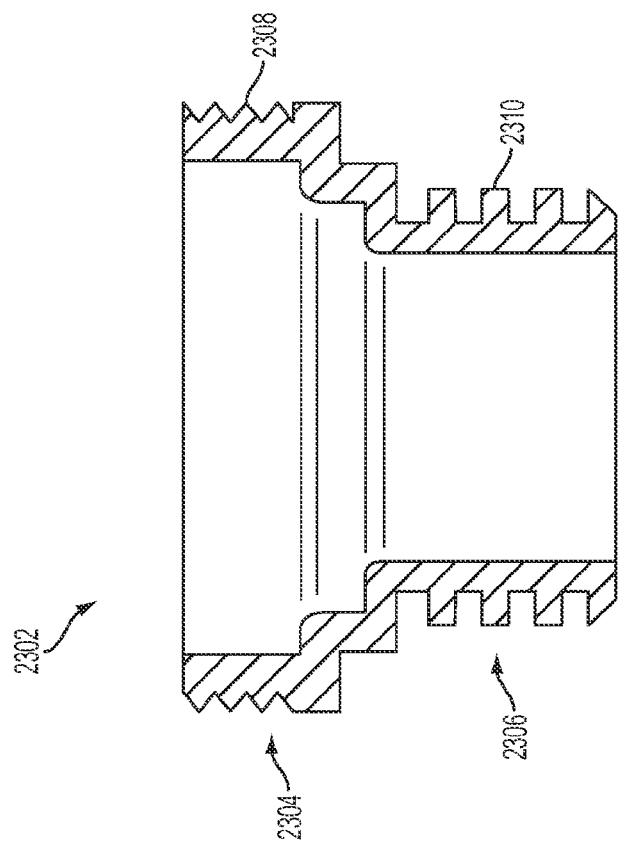
FIG. 24 is a cross-sectional view of a small-sized removable stem of FIG. 23 according to one embodiment.

FIG. 24 is a cross-sectional view of the small-sized removable stem 2302 of FIG. 23 according to one embodiment. The removable stem 2302 includes a funnel attachment portion 2304 with threading 2308 and an insertable portion 2306 with ribbing elements 2310. The insertable portion 2306 can have an external diameter, including ribbing elements 2310, of about 1.625 inches (e.g., between about 1.56 and about 1.69 inches). The insertable portion 2306 can have an external diameter, not including ribbing elements 2310, of about 1.50 inches (e.g., between about 1.44 and about 1.56 inches).

In some embodiments, other sizes of removable stems can be used that have insertable portions of different external diameter, both with and without ribbing elements.

In some embodiments, different size removable stems 1902, 2102, 2302 will have funnel attachment portions 1904, 2104, 2304 that are sized to fit the same stem receptacle 1308. The fuel surge arresting system disclosed herein can be distributed as a kit containing a single fuel surge arrestor comprising the funnel and vent and a set of removable stems of different sizes. A user can select the appropriate stem to fit inside the fuel fill receptacle of the vehicle to be refueled, then attach that stem to the funnel of the fuel surge arrestor. At a later time, the user can remove that stem and attach another stem in order to refuel a different vehicle having a different-sized fuel fill receptacle.

In some embodiments, the removable stems 1902, 2102, 2302 can attach to one another. In such embodiments, a small removable stem 2302 may be designed with a funnel attachment portion 2304 that is capable of fitting within a medium-sized removable stem 1902, which in turn has a funnel attachment portion 1904 capable of fitting within a large removable stem 2102. In such embodiments, the large and medium removable stems 2102, 1902 can include stem receptacles therein for accepting the next-lower-sized removable stem.

The fuel surge arrestor 100, including the vent 202, funnel 204, baffles 252, and other parts can be made of metal, plastic, or any other suitable material.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A fuel surge arrestor for use on marine fuel-powered crafts, comprising:

a funnel having a nozzle opening, the funnel fluidly connecting a removable vent and a stem to create a fluid pathway, the removable stem insertable within a fuel fill pipe and including at least one ribbing element for establishing a seal with the fuel fill pipe, wherein the vent comprises a plurality of offset overlapping baffles positioned within the vent and extending from a wall of the vent to partially occlude the fluid pathway; and an additional stem removably couplable to the funnel for replacing the removable stem on the funnel, wherein insertable portions of the removable stem and the additional stem have different diameters.

2. The fuel surge arrestor of claim 1, wherein each of the plurality of offset overlapping baffles extends from the wall of the vent at respective angles between approximately 20° and approximately 25°.

3. The fuel surge arrestor of claim 1, wherein each of the plurality of offset overlapping baffles extends beyond a center axis of the vent.

4. The fuel surge arrestor of claim 1, wherein the removable stem comprises threading adapted to fit a stem receptacle of the funnel.

5. The fuel surge arrestor of claim 1, further comprising an insert positionable within the nozzle opening.

6. A method of refueling a marine fuel-powered craft, comprising coupling a stem to a funnel of a fuel surge arrestor, wherein coupling the stem includes selecting the stem from a group of stems having insertable portions with different diameters;

inserting the stem of the fuel surge arrestor in a fuel fill receptacle of the marine fuel-powered craft, the funnel of the fuel surge arrestor having a nozzle opening, the funnel fluidly connecting a vent and the stem to create a fluid pathway, the stem including at least one ribbing element for establishing a seal with the fuel fill receptacle, wherein the vent comprises a plurality of offset overlapping baffles positioned within the vent and extending from a wall of the vent to partially occlude the fluid pathway;

inserting a fuel fill nozzle in the nozzle opening; and fueling the vehicle using the fuel fill nozzle.

7. The method of claim 6, wherein inserting the fuel fill nozzle in the nozzle opening further includes inserting the fuel fill nozzle into the stem.

8. The method of claim 6, wherein coupling the stem to the funnel comprises screwing together the stem and the funnel.

9. The method of claim 6, wherein the group of stems comprises at least two of:

a first stem having a first external diameter between about 1.56 inches and about 1.69 inches;

a second stem having a second external diameter between about 1.80 inches and 1.95 inches; and a third stem having a third external diameter between about 2.28 inches and about 2.47 inches.

10. A fuel surge arresting system for use in a marine environment, the fuel surge arresting system comprising:

a fuel surge arrestor comprising a funnel having a nozzle opening and a stem receptacle, the funnel fluidly connecting a vent and the stem receptacle to create a fluid pathway, wherein the vent comprises a plurality of offset overlapping baffles positioned within the vent and extending from a wall of the vent to partially occlude the fluid pathway;

a stem removably couplable to the stem receptacle, the stem insertable within a fuel fill pipe and including at least one ribbing element for establishing a seal with the fuel fill pipe; and an additional stem removably couplable to the stem receptacle, wherein insertable portions of the stem and the additional stem have different diameters.

11. The fuel surge arresting system of claim 10, wherein each of the plurality of offset overlapping baffles extends from a wall of the vent at respective angles between approximately 20° and approximately 25°.

12. The fuel surge arresting system of claim 10, wherein the stem includes threading and wherein the stem is removably couplable to the stem receptacle by screwing the stem and the stem receptacle together.

* * * * *